US009559619B2

(12) United States Patent
Peterson et al.

(10) Patent No.: US 9,559,619 B2
(45) Date of Patent: Jan. 31, 2017

(54) ELECTRONICALLY CONTROLLED SWITCH FOR AN ELECTRIC MOTOR

(71) Applicant: Nidec Motor Corporation, St. Louis, MO (US)

(72) Inventors: Gregory A. Peterson, South Barrington, IL (US); David E. Lass, Addison, IL (US)

(73) Assignee: Nidec Motor Corporation, St. Louis, MO (US)

( * ) Notice: Subject to any disclaimer, the term of this patent is extended or adjusted under 35 U.S.C. 154(b) by 25 days.

(21) Appl. No.: 14/752,242

(22) Filed: Jun. 26, 2015

(65) Prior Publication Data
US 2015/0376829 A1 Dec. 31, 2015

Related U.S. Application Data

(60) Provisional application No. 62/019,113, filed on Jun. 30, 2014.

(51) Int. Cl.
*F26B 23/00* (2006.01)
*H02P 1/44* (2006.01)
*D06F 58/28* (2006.01)

(52) U.S. Cl.
CPC ............. *H02P 1/44* (2013.01); *H02P 29/0241* (2016.02); *D06F 2058/289* (2013.01); *D06F 2058/2858* (2013.01); *D06F 2058/2877* (2013.01)

(58) Field of Classification Search
CPC ........... F26B 19/00; F26B 21/00; F26B 23/00; H02R 1/00; H02R 1/16; H02R 1/42; H02R 23/00
(Continued)

(56) References Cited

U.S. PATENT DOCUMENTS 3,046,624 A * 7/1962 Dietert ...................... B22C 5/08
34/612
3,273,256 A * 9/1966 Behrens .................. D06F 43/00
34/530
(Continued)

FOREIGN PATENT DOCUMENTS

WO 2009148197 A1 12/2009
WO WO 2012121902 A1 * 9/2012 ............. H02P 1/028

OTHER PUBLICATIONS

PCT International Search Report and Written Opinion from PCT Application No. PCT/US2015/038119 entitled Electronically Controlled Switch for an Electric Motor (Dated Sep. 25, 2015).

*Primary Examiner* — Stephen M Gravini
(74) *Attorney, Agent, or Firm* — Hovey Williams LLP

(57) ABSTRACT

A system in which the operation of an electric motor is controlled by electronically controlled switches. The system includes the motor having a run winding and a start winding, a heating component, and a motor control subsystem. A control unit closes a first switch to energize the run winding, closes a second switch to energize the start winding, determines based on an amplitude and a lag time of a current flowing through the motor whether the motor has started and is running normally, and if so, opens the second switch to de-energize the start winding and closes a third switch to activate the heating component. The control unit determines whether the motor has started and is running normally by comparing the real time amplitude and lag time of the current to a plurality of stored amplitudes and lag times associated with different operating conditions.

31 Claims, 6 Drawing Sheets

(58) Field of Classification Search
USPC .... 34/282, 524, 486; 318/729, 786; 219/497
See application file for complete search history.

(56) References Cited

U.S. PATENT DOCUMENTS

| | | | | | |
|---|---|---|---|---|---|
| 4,477,982 | A * | 10/1984 | Cotton | ............... | D06F 58/28 34/550 |
| 4,483,082 | A * | 11/1984 | Ellingson | ............... | D06F 58/28 34/526 |
| 5,013,990 | A * | 5/1991 | Weber | ............... | H02P 23/26 318/812 |
| 6,400,119 | B1 * | 6/2002 | Garza | ............... | G05F 1/70 318/729 |
| 7,594,343 | B2 * | 9/2009 | Woerdehoff | ............... | D06F 58/28 219/497 |
| 7,658,015 | B1 * | 2/2010 | Gardell | ............... | D06F 58/02 34/210 |
| 7,765,716 | B2 * | 8/2010 | Kim | ............... | D06F 58/04 134/1 |
| 7,913,418 | B2 * | 3/2011 | Carow | ............... | D06F 58/28 137/803 |
| 7,941,937 | B2 * | 5/2011 | Do | ............... | D06F 58/28 219/201 |
| 8,042,283 | B2 * | 10/2011 | Nakiri | ............... | D06F 25/00 134/72 |
| 8,250,776 | B2 * | 8/2012 | Yoo | ............... | D06F 33/02 194/317 |
| 8,502,492 | B2 * | 8/2013 | Marcoccia | ............... | H02P 1/028 318/438 |
| 8,661,706 | B2 * | 3/2014 | Bellinger | ............... | D06F 58/28 34/486 |
| 8,793,899 | B2 * | 8/2014 | Kroeger | ............... | D06F 58/10 34/381 |
| 9,015,958 | B2 * | 4/2015 | Bloemendaal | ............... | F26B 3/06 324/664 |
| 9,024,554 | B2 * | 5/2015 | Yun | ............... | H02P 3/00 318/400.09 |
| 9,397,603 | B2 * | 7/2016 | Valenti | ............... | H02P 25/18 |
| 2005/0184699 | A1 | 8/2005 | Unno | | |
| 2013/0088183 | A1 | 4/2013 | Marcoccia | | |
| 2014/0041249 | A1 | 2/2014 | Jung et al. | | |
| 2014/0132199 | A1 | 5/2014 | Zanelato et al. | | |
| 2015/0376829 | A1 * | 12/2015 | Peterson | ............... | H02P 29/024 34/282 |

* cited by examiner

ELECTRONICALLY CONTROLLED SWITCH FOR AN ELECTRIC MOTOR

RELATED APPLICATION

The present non-provisional patent application claims priority benefit of an earlier-filed U.S. provisional patent application having the same title, Ser. No. 62/019,113, filed Jun. 30, 2015. The content of the identified earlier-filed application is hereby incorporated by reference into the present application as if set forth in its entirety.

FIELD

The present invention relates to systems and methods for controlling the operation of electric motors.

BACKGROUND

Electric motors that drive heavy loads require start windings to temporarily supplement run windings when starting. The de-energizing of the start winding once the electric motor has started is controlled by a mechanical centrifugal switch located on the motor shaft, wherein the centrifugal switch opens when the shaft reaches normal operating speed. In a clothes dryer, for example, the mechanical centrifugal switch has two sets of contacts, S1 and S2, that activate when the electric motor reaches a predetermined speed. S1 opens to de-energize the start winding which is no longer needed, and S2 closes to activate a heater circuit. The heater circuit is also controlled by other devices electrically connected in series with it in order to control the temperature of the dryer, but S2 ensures that the heater does not energize when the electric motor is not spinning. Though simple and inexpensive, mechanical centrifugal switches suffer from several problems and limitations, including that they have make noise when they open and close and can be prone to manufacturing quality issues.

This background discussion is intended to provide information related to the present invention which is not necessarily prior art.

SUMMARY

Embodiments of the present invention solve the above-described and other problems and limitations by providing a machine having an electric motor system in which the operation of an electric motor is controlled by electronically controlled switches rather than a conventional mechanical centrifugal switch, thereby avoiding the noise and potential manufacturing quality issues associated with the use of the centrifugal switch.

A machine constructed in accordance with an embodiment of the present invention may broadly comprise the electric motor system including an electric motor having a run winding and a start winding, a heating component, and a motor control subsystem electrically connected to the electric motor and the heating component and operable to control their operation. The motor control subsystem may include a control unit; a user interface in electrical communication with the control unit and operable to receive a user input from a user and communicate the user input to the control unit; a first electronically controlled switch electrically connected in series between the control unit and the run winding of the electric motor and operable to control flow of electric current to the run winding in response to a first control signal from the control unit; a second electronically controlled switch electrically connected in series between the control unit and the start winding of the electric motor and operable to control the flow of electric current to the start winding in response to a second control signal from the control unit; a voltage sensor in electrical communication with the control unit and operable to sense a voltage being applied to the electric motor and to provide a first input signal to the control unit regarding the sensed voltage, a current sensor in electrical communication with the control unit and electrically connected in series with the electric motor and operable to sense the electric current flowing through the electric motor and to provide a second input signal to the control unit regarding the sensed current, and a third electronically controlled switch electrically connected in series between the control unit and the heating component and operable to control activation of the heating component in response to a third control signal from the control unit.

The control unit may be operable to send the first control signal to close the first electronically controlled switch and thereby energize the run winding of the electric motor, send the second control signal to close the second electronically controlled switch and thereby energize the start winding of the electric motor, determine based on the first and second input signals whether the electric motor has started, and if the electric motor has started, send a fourth control signal to open the second electronically controlled switch and thereby de-energize the start winding of the electric motor. The control unit may be further operable to determine based on the first and second input signals whether the electric motor is operating normally, and if the electric motor is operating normally, send the third control signal to close the third electronically controlled switch and thereby activate the heating component.

In various implementations of the first embodiment, the machine may further include any one or more of the following additional features. The machine may be a residential or commercial appliance, such as a clothes dryer. The electric motor may be an electric induction or a permanent magnet motor. The control unit may be a microprocessor. The current sensor may be a resistor, a transformer, or a Hall effect sensor. The motor control subsystem may further include a watchdog circuit electrically connected to the third electronically controlled switch and independently operable to open the third electronically controlled switch to deactivate the heating component. The motor control subsystem may further include a mechanical thermal limiter located in an area heated by the heating component and independently operable to deactivate the heating component if a temperature in the area heated by the heating component exceeds a maximum temperature. The motor control subsystem may further include a fourth electronically controlled switch electrically connected in series between the third electronically controlled switch and the heating component and independently operable to control activation of the heating component in response to the third control signal from the control unit. The motor control subsystem may further include a temperature sensor located in an area heated by the heating component and in electrical communication with the control unit and operable to sense a temperature in the area heated by the heating component and to provide a third input signal to the control unit regarding the sensed temperature. The control unit may be operable to determine based on the first and second input signals whether the electric motor is operating normally by determining an amplitude and a lag associated with the electric current and comparing the amplitude and the lag to a plurality of stored amplitudes and lags associated with different operating conditions. The first, second, and third electronically controlled switches may be powered by the electric motor, wherein the first and second electronically controlled switches may be normally closed and the third electronically controlled switch may be normally open.

Additionally, each of these implementations and embodiments may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention, Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention is a machine having an electric motor system in which the operation of an electric motor is controlled by electronically controlled switches rather than a conventional mechanical centrifugal switch, thereby avoiding the noise and potential manufacturing quality issues associated with the use of the centrifugal switch.

Figure 1:
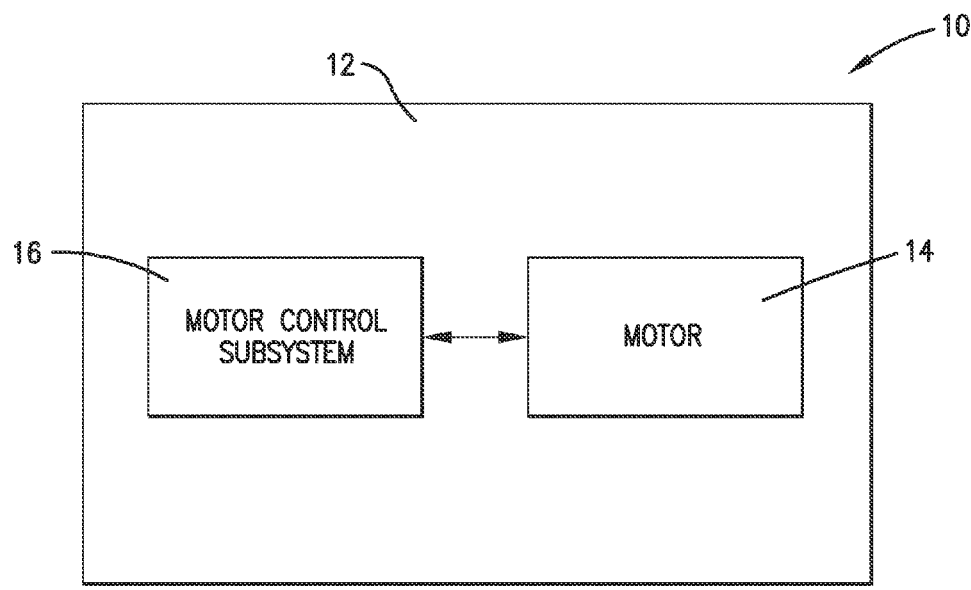
FIG. 1 is a schematic diagram of a first embodiment of a machine constructed in accordance with the present invention.
Figure 3:
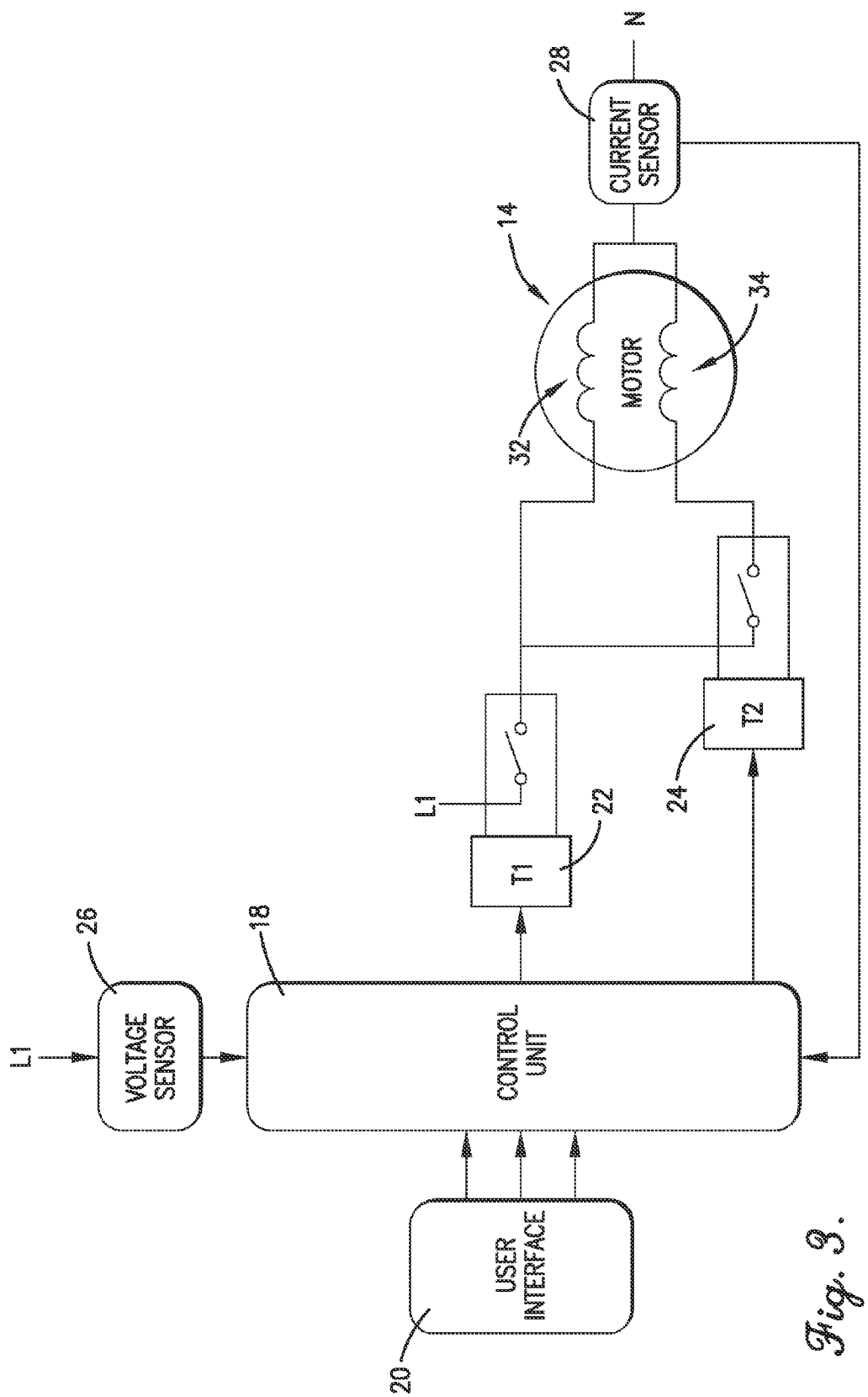
FIG. 3 is a block diagram of a motor control subsystem of the first embodiment of the machine of FIG. 1.

Referring to the figures, a machine 10 constructed in accordance with the present invention is shown. Referring to FIG. 1, in a first embodiment the machine 10 may broadly include an electric motor system 12 having an electric motor 14 and a motor control subsystem 16. Referring also to FIG. 3, the motor control subsystem 16 may include a control unit 18; a user interface 20; first and second electronically controlled switches 22,24; a voltage sensor 26; and a current sensor 28. In this first embodiment, the machine 10 may be substantially any machine incorporating the electric motor 14. The electric motor 114 may include a run (or main) winding 32 which is sufficient to drive the electric motor 14 during normal operation, and a start winding 34 which provides temporary supplementary driving force during starting of the electric motor 14. The electric motor 14 may be an electric induction or permanent magnet motor. For example, the electric motor 14 may be a three-phase, four-pole alternating current (AC) induction or permanent magnet motor rated to operate at a maximum voltage of approximately between 190 Volts and 200 Volts and a maximum current of approximately between 4 Amps and 6 Amps. The electric motor 14 may drive any appropriate load. For example, the electric motor 14 may drive a fan, pump, blower, or rotating drum, which may be part of a residential or commercial appliance, such as a clothes dryer or oven, or a heating and air-conditioning unit, which may include additional electrical or mechanical components not described herein.

The motor control subsystem 16 may be broadly operable to control operation of the electric motor 14, including during starting and during normal operation. The control unit 18 may be operable to receive input signals from the user interface 20 and the sensors 26,28 and generate control signals for the first and second electronically controlled switches 22,24. The control unit 18 may be a microprocessor having a memory or able to access a memory. The user interface 20 may be in electrical communication with the control unit 18 and operable to receive input from a user (such as, e.g., to start the electric motor 14) and communicate that input to the control unit 18.

The first electronically controlled switch 22 may be electrically connected in series between the control unit 18 and the run winding 32 of the electric motor 14 and operable to control the flow of electric current to the run winding 32 in response to a first control signal from the control unit 18. The second electronically controlled switch 24 may be electrically connected in series between the control unit 18 and the start winding 34 of the electric motor 14 and operable to control the flow of electric current to the start winding 34 in response to a second control signal from the control unit 18.

The voltage sensor 26 may be in electrical communication with the control unit 18 and operable to sense a voltage being applied to the electric motor 14 and to provide a first input signal to the control unit 18 regarding the sensed voltage. The current sensor 28 may be in electrical communication with the control unit 18 and electrically connected in series with the electric motor 14 and operable to sense the electric current flowing through the electric motor 14 and to provide a second input signal to the control unit 18 regarding the sensed current. The current sensor 28 may be a resistor, a transformer, a Hall effect sensor, or other suitable current-sensing device.

Figure 2:
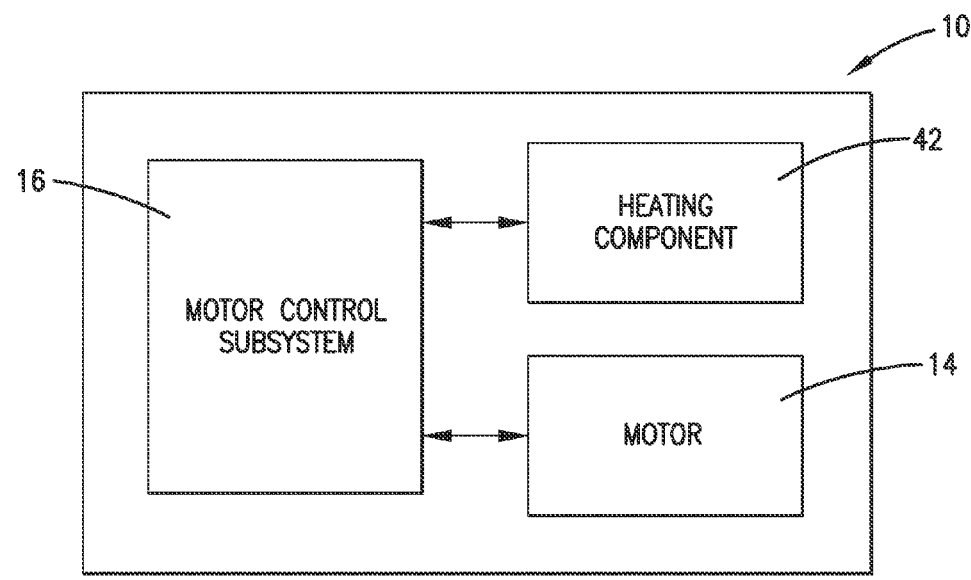
FIG. 2 is a schematic diagram of a second embodiment of the machine constructed in accordance with the present invention.
Figure 4:
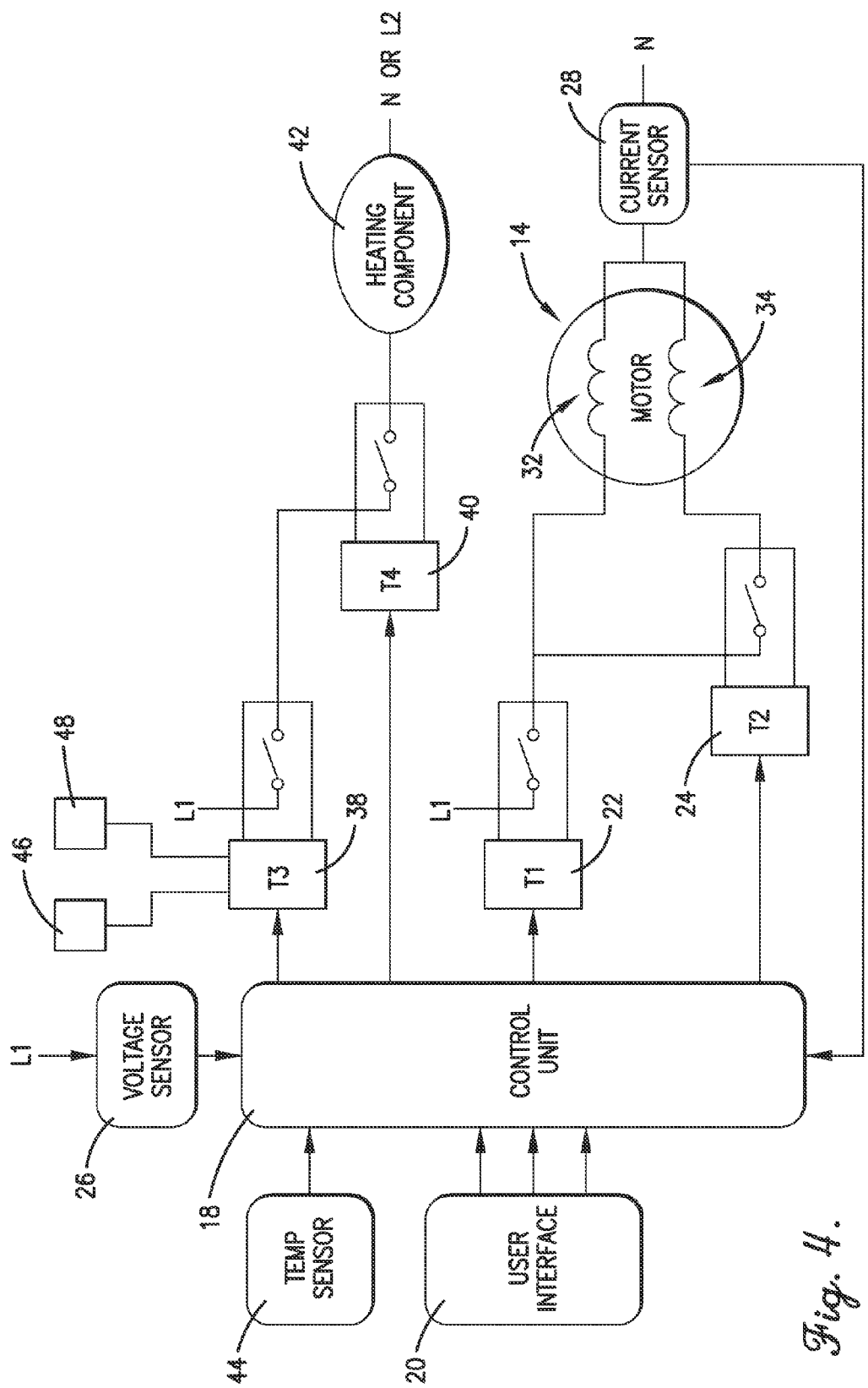
FIG. 4 is a block diagram of the motor control subsystem of the second embodiment of the machine of FIG. 2.

Referring to FIG. 2, in a second embodiment the machine 10 may broadly include the electric motor system 12 having the electric motor 14, the motor control subsystem 16, and a heating component 42. Referring also to FIG. 4, the motor control subsystem 16, may include the control unit 18; the user interface 20; the first and second electronically controlled switches 22,24; the voltage sensor 26; the current sensor 28; third and fourth electronically controlled switches 38,40; and a temperature sensor 44. In this second embodiment, the machine 12 may be a clothes dryer, oven, heating unit or substantially any residential or commercial machine incorporating the electric motor 14 and the heating component 42.

The third electronically controlled switch 38 may be electrically connected in series between the control unit 18 and the heating component 42 and operable to control activation of the heating component 42. In response to a third control signal from the control unit 18. The third electronically controlled switch 38 may be further controlled by a watchdog circuit 46 operable to open the electronically controlled switch 38 if the control unit 18 fails. Additionally, a mechanical thermal limiter 48 may be located in an area heated by the heating component 42 and electrically connected in series with the heating component 42 and operable to deactivate the heating component 42 if the temperature in the area exceeds a maximum temperature. In addition or as an alternative to the watchdog circuit 46 and/or mechanical thermal limiter 48, the fourth electronically controlled switch 40 may be electrically connected in series between the third electronically controlled switch 38 and the heating component 42 and operable to control activation of the heating component 42 in response to the same third control signal from the control unit 18, thereby providing redundancy in case the third electronically controlled switch 38 fails to open when required to do so.

The various electronically controlled switches 22,24,38, 40 may be relays, triacs, or other types of electronically controlled switches. For example, if the electric motor 14 draws 30 Amps, then the electronically controlled switches 22,24,38,40 may be 1 Watt relays. Furthermore, the electronically controlled switches 22,24,38,40 may be of different types. For example, the second electronically controlled switch 24 may be a less robust type than the first electronically controlled switch 22 because the first electronically controlled switch 22 carries most of the electric current flowing to the electric motor 14.

The heating component 42 is operable to generate heat, such as when used in a clothes dryer, oven, or heating unit. The heating component 42 may use electricity, gas, or other technology to generate the heat. The temperature sensor 44 may be in electrical communication with the control unit 18 and located in an area heated by the heating component 42 and operable to sense the temperature created by the heating component 42 and to provide an input signal to the control unit 18 regarding the sensed temperature. The temperature sensor 44 may be a thermistor or other temperature-sensing device.

Figure 5:
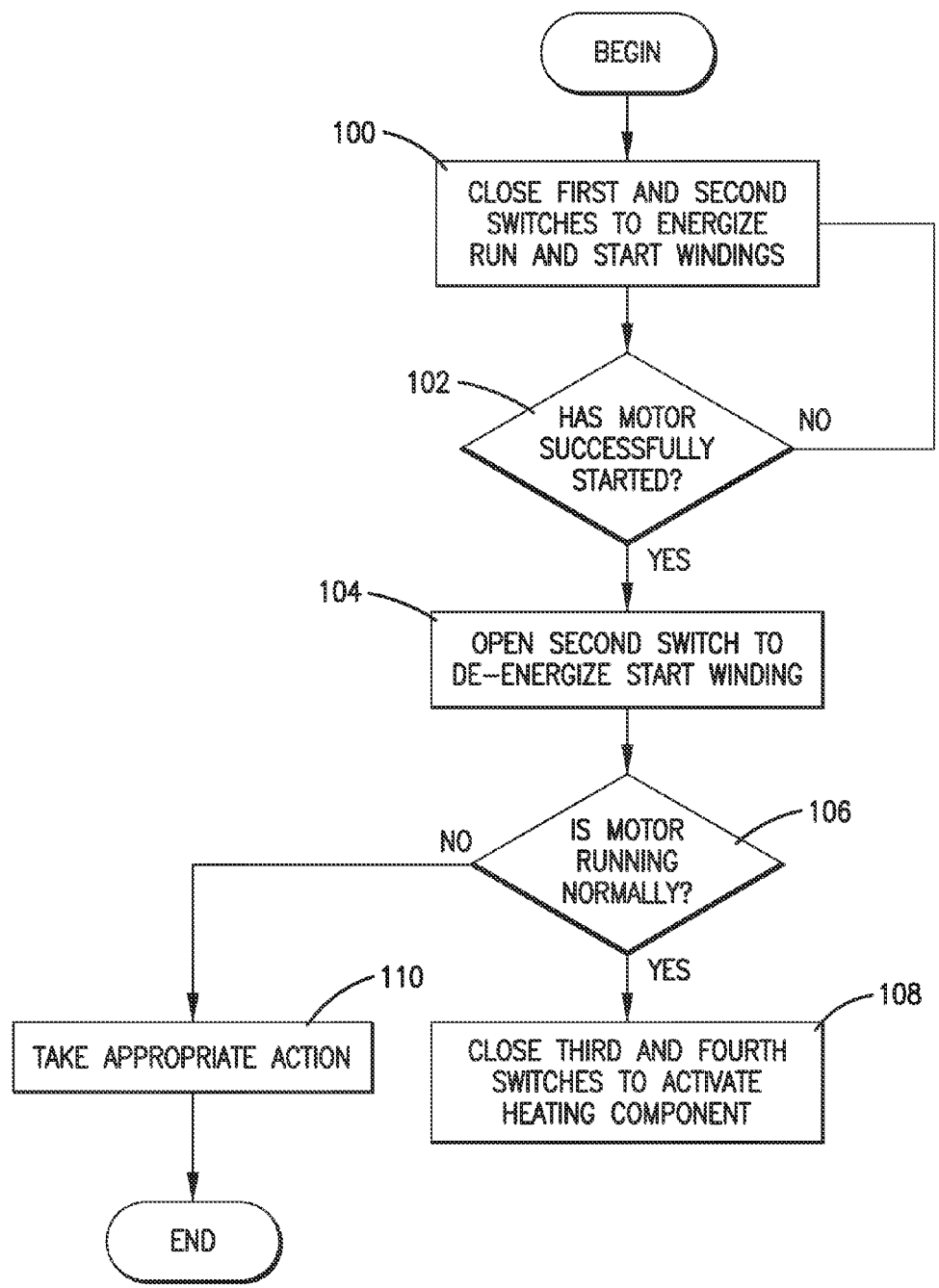
FIG. 5 is a flow diagram of steps involved in the operation of the motor control subsystem of FIG. 4.

Operation of the electric motor system 12 will be described with respect to the second embodiment as the first embodiment operates substantially the same except with regard to the additional components of the second embodiment. Referring to FIG. 5, the control unit 18 may receive input from the user via the user interface 20 to start the machine 10, in which case the control unit 18 sends the first and second control signals to close the first and second electronically controlled switches 22,24 and thereby energize the run and start windings 32,34 to cause the electric motor 14 to try to start, as shown in step 100. The control unit 18 receives input signals from the voltage and current sensors 26,28 and, based thereon, determines whether the electric motor 14 has successfully started, as shown in step 102. If the control unit 18 determines that the electric motor 14 has not successfully started and is not running at the correct speed, the control unit 18 re-sends the second control signal to close the second electronically controlled switch 24 and thereby re-energize the start winding 34, as shown in step 100. After several unsuccessful attempts to start the electric motor 14 and bring it to the correct speed, the control unit 18 may send control signals to open both the first and second electronically controlled switches 22,24 and thereby shut off the electric motor 18. If the control unit 18 determines that the electric motor 14 has successfully started, then it sends the fourth control signal to cause the second electronically controlled switch 24 to open and thereby de-energize the start winding 34, as shown in step 104, and the electric motor 14 thereafter runs normally on the run winding 32. The control unit 18 continues receiving the first and second input signals from the voltage and current sensors 26,28 and, based thereon, determines whether the electric motor 14 is running normally, as shown in step 106. If the control unit 18 determines that the electric motor 14 is running normally, then it sends the third control signal to close the third and fourth electronically controlled switches to activate the heating component 42, as shown in step 108. If the control unit 18 detects abnormal operation, then it takes appropriate action, as shown in step 110, which may include restarting or shutting off the electric motor and/or deactivating the heating component.

Figure 6:
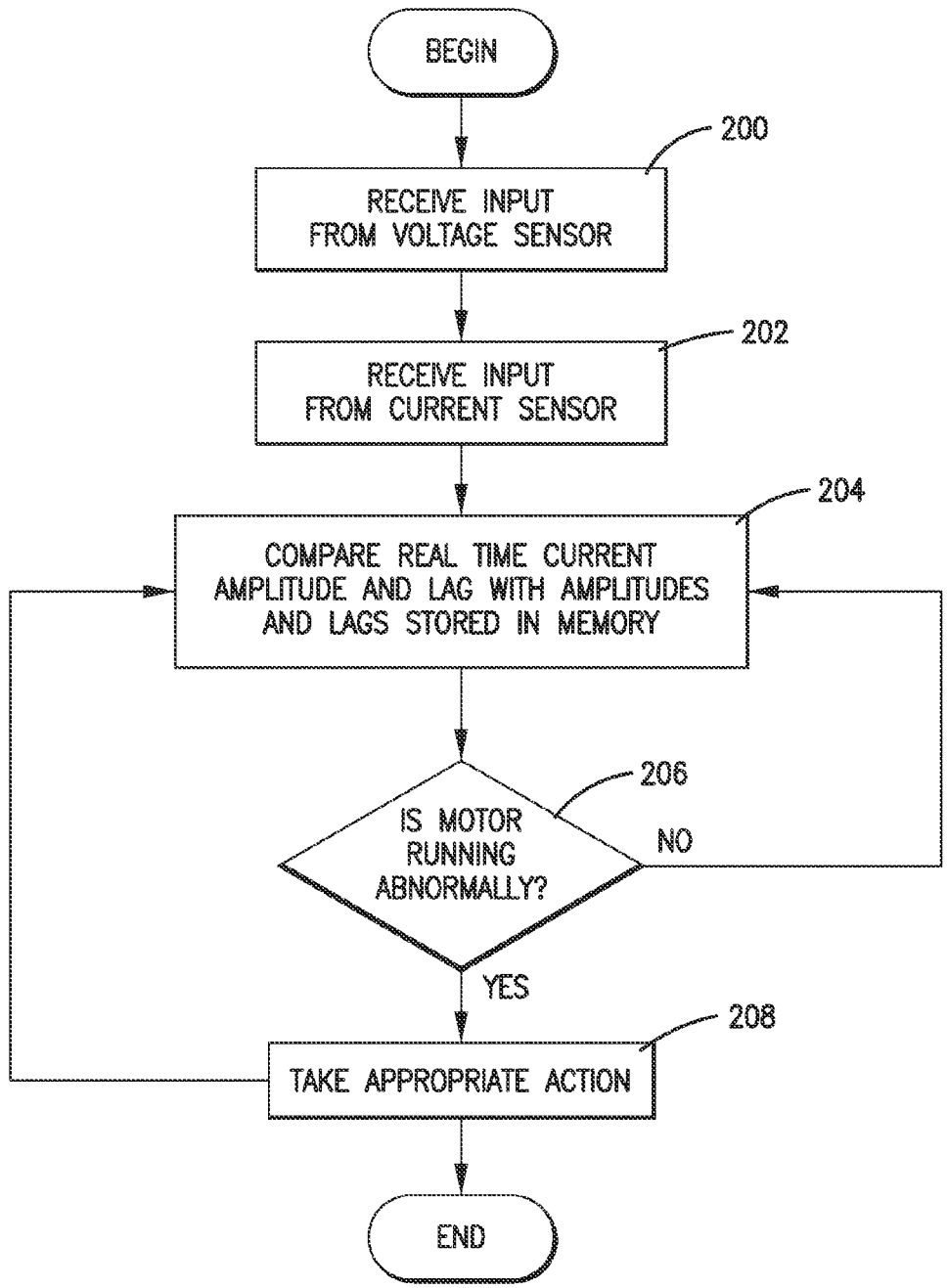
FIG. 6 is a flow diagram of substeps involved in the operation of the motor control subsystem of FIG. 4.
Figure 7:
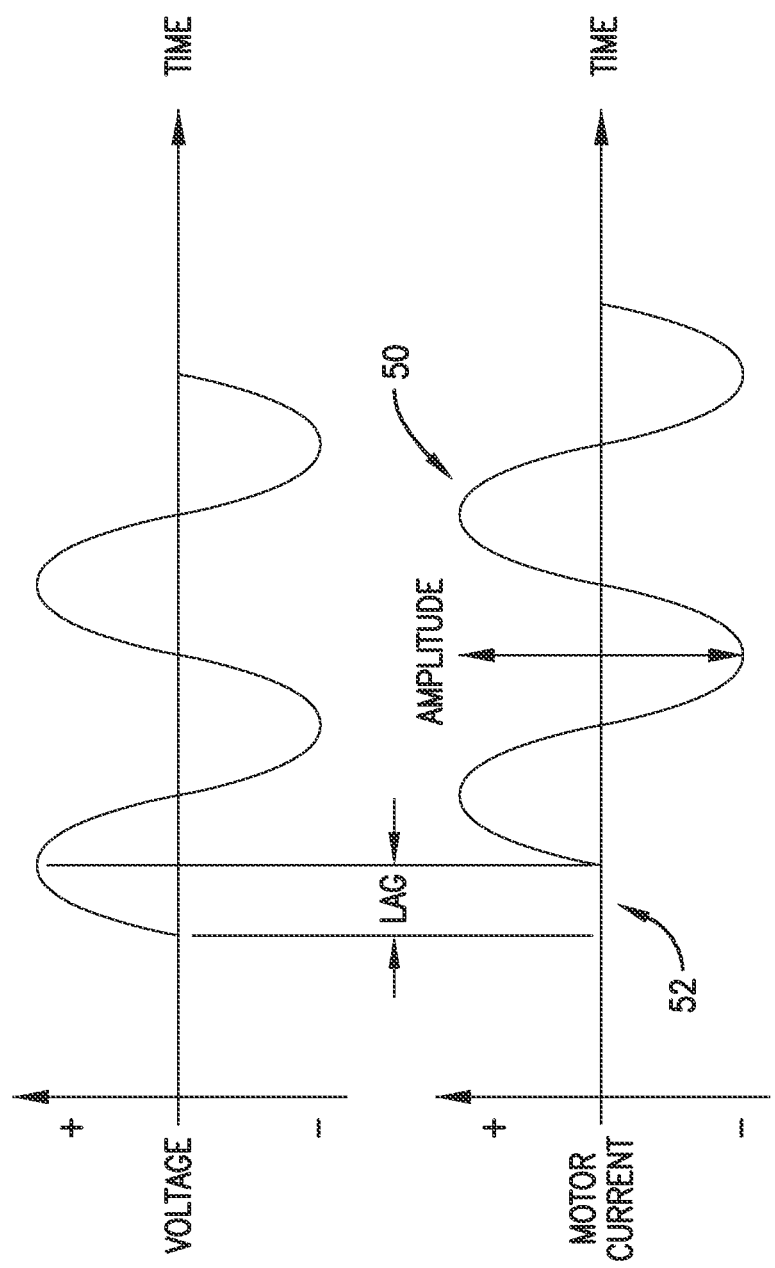
FIG. 7 is a depiction of voltage and current signals associated with the motor control subsystems of FIGS. 3 and 4.

With regard to the control unit 18 using the sensed voltage and current information to monitor the operation of the electric motor 14, the electric motor system may function as follows. Referring to FIG. 6, the control unit 18 receives the first input signal from the voltage sensor 26, as shown in step 200, which synchronizes the control unit 18 to the AC line voltage being applied to the electric motor 14. The control unit 18 receives the second input signal from the current sensor 28, as shown in step 202. Referring also to FIG. 7, the load on the electric motor 14 has some inductance which causes the current through the electric motor 14 to lag the voltage applied to the electric motor 14. The current amplitude 50 and current lag 52 is different during start-up, normal running, and abnormal operations (e.g., a locked rotor, an open winding, or other fault). These different current amplitudes and lag times may be pre-determined and stored in a look-up table in a memory that is part of or accessible to the control unit 18. The different current amplitudes and lag times may be determined for the individual electric motor or for the type of the electric motor, and if the latter, may take into account various manufacturing and/or operational tolerances for the type for the electric motor that might make different individual electric motors of the same type exhibit slightly different current amplitudes and lag times under the same circumstances. During all phases of electric motor operation (e.g., starting, running, stopping), the control unit 18 constantly compares the real time current amplitude and current lag with these patterns stored in memory, as shown in step 204. Based on those comparisons, the control unit 18 determines whether the electric motor 14 is running normally or abnormally, as shown in step 206, and if the electric motor 14 is running abnormally, the control unit 18 takes appropriate action (e.g., restart, shut-off, error signal), as shown in step 208.

In various implementations, one or more of the electronically controlled switches 22,24,38,40 may be physically located on the same circuit board as the control unit 18 and may share the same power supply as the control unit 18, one or more of the electronically controlled switches 22,24,38, 40 may be physically located intermediate between the control unit 18 (i.e., not on the same circuit board as the control unit 18) and the electric motor 14, one or more of the electronically controlled switches 22,24,38,40 may be physically located in close proximity to or on the electric motor 14 and may share the same power supply as the electric motor 14, or any combination thereof.

In one implementation, the electric motor rather than the AC line voltage) may power one or more of the electronically controlled switches 22,24,38,40. In this implementation, the third electronically controlled switch 38 may be normally open (so if power is lost, it opens and de-activates the heating component 42), and the first and second electronically controlled switches 22,24 may be normally closed (so that the electric motor 14 can be started).

In one implementation, a speed sensor may be used in place of the voltage and current sensors 26,28 to provide input to the control unit 18. In this implementation, the speed sensor is used to measure the electric motor's speed, such that when the electric motor 14 reaches a predetermined speed, the second electronically controlled switch 24 is opened to de-energize the start winding 34, and the third and fourth electronically controlled switches 38,40 are closed to activate the heating component 42. Thereafter, the control unit 118 may monitor the speed sensor to determine whether the electric motor 14 is operating at the proper speed, and if it is not, take appropriate action. The speed sensor may be, for example, a Hall effect sensor, an optical sensor, or other speed-sensing device.

Thus, the present invention provides advantages over the prior art, including that it provides the machine 10 having the electric motor system 12 in which the operation of the electric motor 14 is controlled by the electronically controlled switches 22,24,38,40 rather than a conventional mechanical centrifugal switch, thereby avoiding the noise and potential manufacturing quality issues associated with the use of the centrifugal switch.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A machine comprising:
    an electric motor system including—
        an electric motor having a run winding and a start winding, and
        a motor control subsystem electrically connected to the electric motor and operable to control operation of the electric motor, the motor control subsystem including—
            a control unit,
            a user interface in electrical communication with the control unit and operable to receive a user input from a user and communicate the user input to the control unit,
            a first electronically controlled switch electrically connected in series between the control unit and the run winding of the electric motor and operable to control a flow of electric current to the run winding in response to a first control signal from the control unit,
            a second electronically controlled switch electrically connected in series between the control unit and the start winding of the electric motor and operable to control the flow of electric current to the start winding in response to a second control signal from the control unit,
            a voltage sensor in electrical communication with the control unit and operable to sense a voltage being applied to the electric motor and to provide a first input signal to the control unit regarding the sensed voltage, and
            a current sensor in electrical communication with the control unit and electrically connected in series with the electric motor and operable to sense the electric current flowing through the electric motor and to provide a second input signal to the control unit regarding the sensed current,
            wherein the control unit sends a first control signal to close the first electronically controlled switch and thereby energize the run winding of the electric motor, sends a second control signal to close the second electronically controlled switch and thereby energize the start winding of the electric motor, determines based on the first and second input signals whether the electric motor has started, and if the electric motor has started, sends a third control signal to open the second electronically controlled switch and thereby de-energize the start winding of the electric motor.

2. The machine as set forth in claim 1, wherein the machine is a residential or commercial appliance.

3. The machine as set forth in claim 2, wherein the machine is a clothes dryer.

4. The machine as set forth in claim 1, wherein the electric motor is an electric induction or a permanent magnet motor.

5. The machine as set forth in claim 1, wherein the control unit is a microprocessor.

6. The machine as set forth in claim 1, wherein the current sensor is selected from the group consisting of a resistor, a transformer, a Hall effect sensor.

7. The machine as set forth in claim 1, wherein the control unit is located on a printed circuit board and receives power from a first power supply, and the electric motor receives power from a second power supply, and the first and second electronically controlled switches are located on the printed circuit board and receive power from the first power supply.

8. The machine as set forth in claim 1, wherein the control unit receives power from a first power supply, and the electric motor receives power from a second power supply, and the first and second electronically controlled switches are located on the electric motor and receive power from the second power supply.

9. A machine comprising:
    an electric motor system including—
        an electric motor having a run winding and a start winding,
        a heating component, and
        a motor control subsystem electrically connected to the electric motor and the heating component and operable to control operation of the electric motor and the heating component, the motor control subsystem including—
            a control unit,
            a user interface in electrical communication with the control unit and operable to receive a user input from a user and communicate the user input to the control unit, a first electronically controlled switch electrically connected in series between the control unit and the run winding of the electric motor and operable to control a flow of electric current to the run winding in response to a first control signal from the control unit, a second electronically controlled switch electrically connected in series between the control unit and the start winding of the electric motor and operable to control the flow of electric current to the start winding in response to a second control signal from the control unit, a voltage sensor in electrical communication with the control unit and operable to sense a voltage being applied to the electric motor and to provide a first input signal to the control unit regarding the sensed voltage, and a current sensor in electrical communication with the control unit and electrically connected in series with the electric motor and operable to sense the electric current flowing through the electric motor and to provide a second input signal to the control unit regarding the sensed current, and a third electronically controlled switch electrically connected in series between the control unit and the heating component and operable to control activation of the heating component in response to a third control signal from the control unit, wherein the control unit is operable to send a first control signal to close the first electronically controlled switch and thereby energize the run winding of the electric motor, send a second control signal to close the second electronically controlled switch and thereby energize the start winding of the electric motor, determine based on the first and second input signals whether the electric motor has started, and if the electric motor has started, send a third control signal to open the second electronically controlled switch and thereby de-energize the start winding of the electric motor, and wherein the control unit is further operable to determine based on the first and second input signals whether the electric motor is operating normally, and if the electric motor is operating normally, send a fourth control signal to close the third electronically controlled switch and thereby activate the heating component.

10. The machine as set forth in claim 9, wherein the machine is a residential or commercial appliance.

11. The machine as set forth in claim 10, wherein the machine is a clothes dryer.

12. The machine as set forth in claim 9, wherein the electric motor is an electric induction or a permanent magnet motor.

13. The machine as set forth in claim 9, wherein e control unit is a microprocessor.

14. The machine as set forth in claim 9, wherein the current sensor is selected from the group consisting of a resistor, a transformer, a Hall effect sensor.

15. The machine as set forth in claim 9, further including a watchdog circuit electrically connected to the third electronically controlled switch and independently operable to open the third electronically controlled switch to deactivate the heating component.

16. The machine as set forth in claim 9, further including a mechanical thermal limiter located in an area heated by the heating component and independently operable to deactivate the heating component if a temperature in the area heated by the heating component exceeds a maximum temperature.

17. The machine as set forth in claim 9, further including a fourth electronically controlled switch electrically connected in series between the third electronically controlled switch and the heating component and independently operable to control activation of the heating component in response to the third control signal from the control unit.

18. The machine as set forth in claim 9, further including a temperature sensor located in an area heated by the heating component and in electrical communication with the control unit and operable to sense a temperature in the area heated by the heating component and to provide a third input signal to the control unit regarding the sensed temperature.

19. The machine as set forth in claim 9, wherein the control unit is operable to determine based on the first and second input signals whether the electric motor is operating normally by determining an amplitude and a lag time associated with the electric current and comparing the amplitude and the lag time to a plurality of stored amplitudes and lags times associated with different operating conditions.

20. The machine as set forth in claim 9, wherein the first, second, and third electronically controlled switches are powered by the electric motor, and wherein the first and second electronically controlled switches are normally closed and the third electronically controlled switch is normally open.

21. A method of controlling an electric motor system, the electric motor system including an electric motor having a run winding and a start winding and a motor control subsystem, the motor control subsystem including a control unit, first and second electronically controlled switches, a voltage sensor, and a current sensor, the method comprising the steps of:

(1) sending by the control unit a first control signal to close the first electronically controlled switch and thereby energize the run winding of the electric motor;

(2) sending by the control unit a second control signal to close the second electronically controlled switch and thereby energize the start winding of the electric motor;

(3) receiving at the control unit a first input signal from the voltage sensor regarding a voltage being applied to the electric motor, and receiving at the control unit a second input signal from the current sensor regarding a current flowing through the electric motor;

(4) determining by the control unit based on the first and second input signals whether the electric motor has started; and (5) if the electric motor has started, sending by the control unit a third control signal to open the second electronically controlled switch and thereby de-energize the start winding of the electric motor.

22. The method as set forth in claim 21, wherein the machine is a residential or commercial appliance.

23. The method as set forth in claim 22, wherein the machine is a clothes dryer.

24. The method as set forth in claim 21, wherein the electric motor is an electric induction or a permanent magnet motor.

25. The method as set forth in claim 21, wherein the control unit is a microprocessor.

26. A method of controlling an electric motor system, the electric motor system including an electric motor having a run winding and a start winding, a heating component, and a motor control subsystem, the motor control subsystem including a control unit, first, second, and third electronically controlled switches, a voltage sensor, and a current sensor, the method comprising the steps of:
(1) sending by the control unit a first control signal to close the first electronically controlled switch and thereby energize the run winding of the electric motor;
(2) sending by the control unit a second control signal to close the second electronically controlled switch and thereby energize the start winding of the electric motor;
(3) receiving at the control unit a first input signal from the voltage sensor regarding a voltage being applied to the electric motor, and receiving at the control unit a second input signal from the current sensor regarding a current flowing through the electric motor;
(4) determining by the control unit based on the first and second input signals whether the electric motor has started;
(5) if the electric motor has started, sending by the control unit a third control signal to open the second electronically controlled switch and thereby de-energize the start winding of the electric motor;
(6) determining by the control unit based on the first and second input signals whether the electric motor is operating normally; and
(7) if the electric motor is operating normally, sending by the control unit a fourth control signal to close the third electronically controlled switch and thereby activate the heating component.

27. The method as set forth in claim 26, wherein the step (6) of determining whether the electric motor is operating normally includes—
determining by the control unit based on the first and second input signals an amplitude and a lag time associated with the electric current;
comparing by the control unit the amplitude and the lag time to a plurality of stored amplitudes and lag times associated with different operating conditions.

28. The method as set forth in claim 26, wherein the machine is a residential or commercial appliance.

29. The method as set forth in claim 28, wherein the machine is a clothes dryer.

30. The method as set forth in claim 26, wherein the electric motor is an electric induction or a permanent magnet motor.

31. The method as set forth in claim 26, wherein the control unit is a microprocessor.

* * * * *